INVENTORS
JEAN FOULARD
JEAN GALEY
By Young & Thompson
ATTYS.

United States Patent Office 3,743,500
Patented July 3, 1973

3,743,500
NON-POLLUTING METHOD AND APPARATUS FOR PURIFYING ALUMINUM AND ALUMINUM-CONTAINING ALLOYS
Jean Foulard, Ablon, and Jean Galey, Saint-Maur-des-Fosses, France, assignors to L'Air Liquide Societe Anonyme Pour l'Etude et l'Exploitation des Procedes Georges Claude, Paris, France
Continuation-in-part of abandoned application Ser. No. 782,040, Dec. 9, 1968. This application Nov. 22, 1971, Ser. No. 201,149
Claims priority, application France, Jan. 10, 1968, 135,515
Int. Cl. C22b 21/00, 45/00, 9/02
U.S. Cl. 75—93                           17 Claims

ABSTRACT OF THE DISCLOSURE

To degasify aluminum and aluminum alloys, a ladle is provided with two compartments interconnected by a bottom passage. Inert gas is insufflated in very fine bubbles into the lower portion of both compartments. The molten metal flows down the upstream compartment, then flows up the downstream compartment. There is no inner impediment in the compartments, nor in the passage.

---

Figure 1:
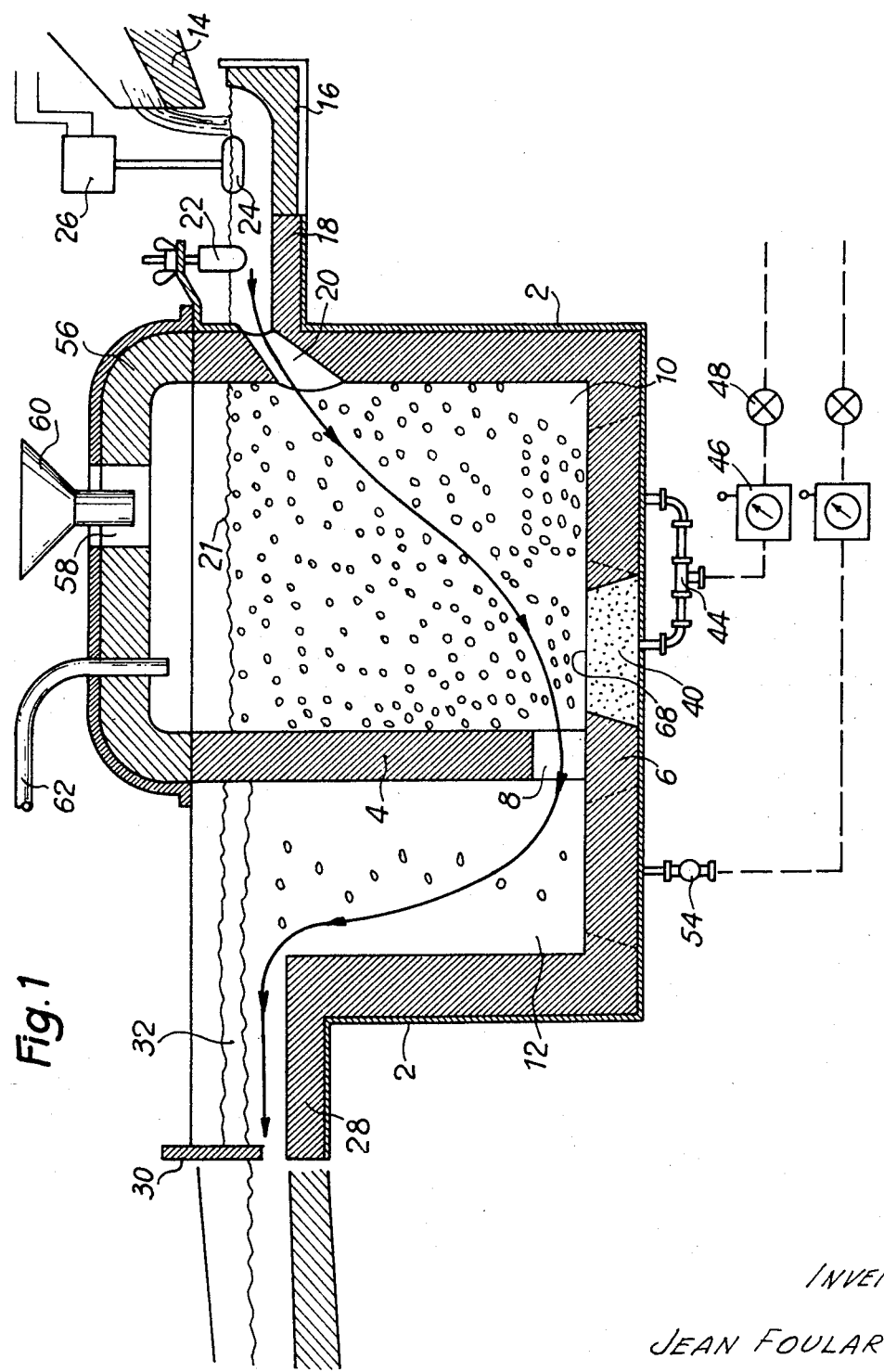

This application is a continuation-in-part of our co-pending application Ser. No. 782,040, filed Dec. 9, 1968, now abandoned.

Our invention relates to a throughflow method and apparatus for purifying aluminum and aluminum-containing alloys in the molten state.

The objects of this purification are mainly to degas the metal, among others to remove hydrogen from it, and to remove the undissolved inclusions, which generally are finely granular aluminum oxide. This purification is performed on the primary aluminum which will not be melted anew, for instance upon aluminum for slabs, plates or billets. It is also effected upon reclaimed aluminum and aluminum alloys and before casting these metals.

The conventional method of purification is to inject chlorine into the molten metal.

Chlorine injection suffers severe drawbacks since this gas is very corrosive and its lethal concentration in air for a sojourn of a few minutes is only about 5 p.p.m.

The foundries receive liquid chlorine in tank cars, which gives rise to security problems during transportation, storage and handling. Chlorine is then fed to injection lances, by tubes and valves which are corroded unless special steels are used. Casual leaks are quite dangerous.

The fumes from the metal bath into which chlorine is injected contain elemental chlorine and volatile chlorides which also are poisonous and corrosive. This necessitates costly and cumbersome devices for collecting and neutralizing the fumes. The neutralization itself pollutes the water in which is dissolved the reactant and the unavoidable leaks pollute the ambient air.

A non-polluting purifying method for light metals is used and is the subject of U.S. Pat. No. 3,039,864. This method makes use of gas insufflation for degassing and of a filter bed of fine ceramic bodies for eliminating the finely divided, undissolved solids from the molten metal to be treated. The insufflated gas passes through the filter bed countercurrent to the molten metal. However, this method has important practical drawbacks. The passage of gas between the filtering grains creates channels and the molten metal follows the channels and does not encounter the main streams of gas. The filter bed causes an important loss of heat, which lowers the posisble metal flow; the crucible must then be large relative to output, which makes heating necessary since it is insufficiently warmed by the metal. Still further, the filter bed rapidly clogs and must be changed after only a fraction of a working day. The change interrupts the useful operation and is an unpleasant operation, and is costly since the crucible is temporarily out of operation and must be emptied, then refilled, and the next metal must be purified thereafter. Suppressing the filter in this known method and resorting only to the insufflation which passed through the filter resulted in an unsound metal since the pre-existing solid particles were not eliminated and were supplemented by particles pulled off the refractory lining of the crucible.

We have found that we can overcome the foregoing difficulties by an insufflation method in which degassing is mainly effected by fine bubbles of gas flowing countercurrent to a downward flow of molten metal, and inclusion removal is performed on the metal degased by the first named fine bubbles, by a second injection of fine bubbles of gas, flowing in the same upward direction as the metal. The passages for the molten metal being treated are free from inner impediments such as filters which would clog and the injected gas is non-toxic and non-corrosive so that the environment cannot suffer. Examples of such gases which may be used for the invention are nitrogen, argon and helium.

Figure 2:
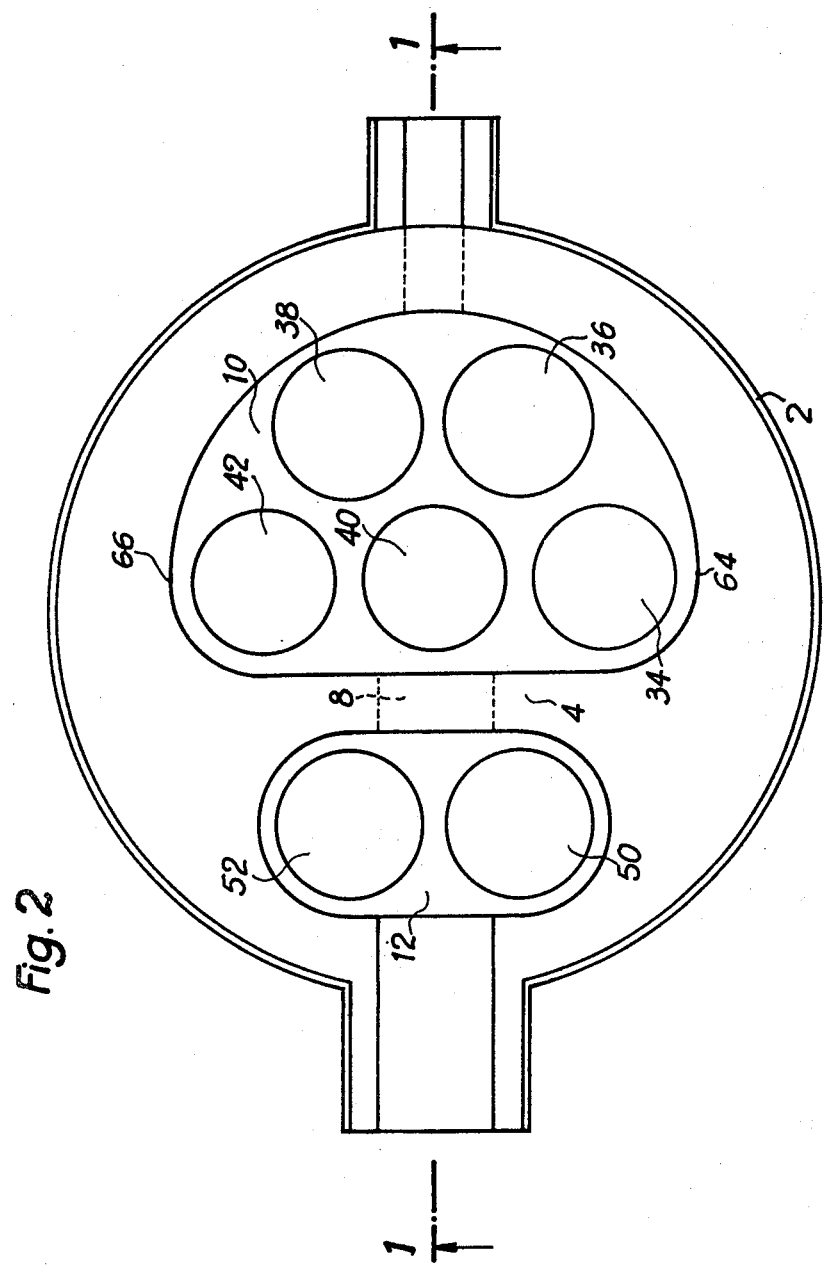
Figure 3:
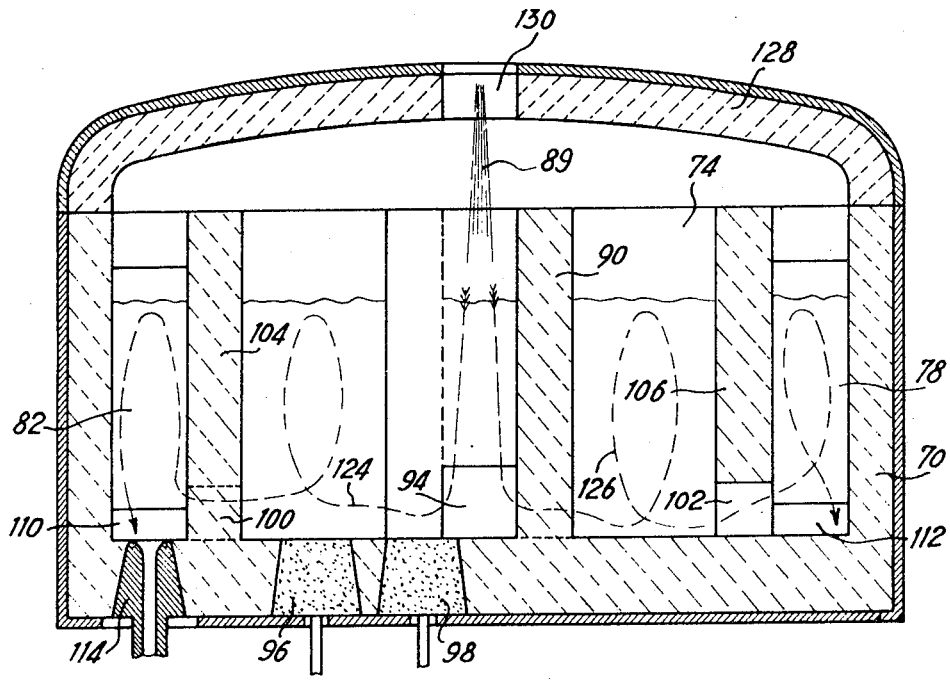
Figure 4:
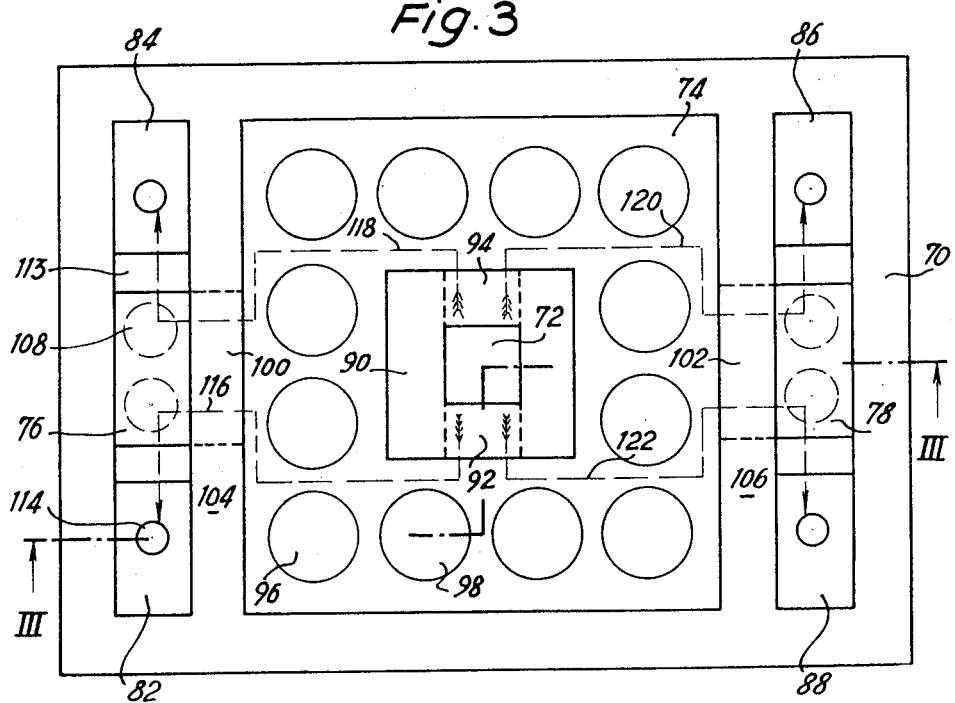

These and other features will more clearly appear from the following description and the accompanying drawings, in which:

FIG. 1 shows a ladle or tank in sectional view taken on the vertical plane I—I of FIG. 2; and FIG. 2 is a plan view of the two compartments of the ladle of FIG. 1, with the cover removed.

The ladle shown in the drawings is made of refractory material surrounded by an armoring 2 of thick metal plate; thermal insulation (not shown) reduces heat losses. It is circular in general form, with a partition 4 dividing it into two unequal compartments and with a bottom 6. A passage 8, in the lower portion of the partition, provides communication between the upstream compartment 10 and the downstream compartment 12. Its general form is rectangular.

The ladle is provided with means (not shown) for rotating it in order to empty it at the end of a run.

Aluminum or aluminum alloy to be treated is poured through the spout 14 of the furnace from which it comes, and is then brought by a channel 16 into the inlet duct 18 of the ladle. From this duct the metal debouches through a passage 20 into the upstream compartment, slightly below the level 21 of the metal in this compartment; it descends in the compartment 10, from which it issues through the passage 8.

An adjustable transverse partition 22 bars the upper portion of the duct to stop the slag; it also makes the level in the duct rise in accordance with the rate of flow.

A known device, for example a float 24, operates a switch 26 which controls the inclination of the furnace; thus a constant level is maintained in the duct 18, in accordance with the rate of flow desired for the metal passing through the tank or ladle.

In the outlet ducts 28 of the ladle another transverse partition 30 prevents the outflow of molten slag 32 surmounting the metal of the downstream compartment; it also retains the inclusions which have been swept toward the surface by the bubbles of gas introduced into the downstream compartment. If slag 32 is not provided, then the impurities floated by the bubbles will still occupy the same position and will still collect behind partition 30.

The bottom of the upstream compartment is occupied for the greater part by five porous, gas-permeable elements 34, 36, 38, 40, 42 in the form of plugs, through which a gas is injected. At 44 there is shown a part of the pipe supplying these porous elements; the gas passes through a flowmeter 46 and a pressure-regulating expansion valve 48. The elements are sufficiently near to the walls of the compartment and to one another to ensure that substantially all the metal in this compartment is throroughly mixed with the gas bubbles; these bubbles escape substantially over the entire surface 21 after having passed upward through the compartment 10.

In the upstream compartment, the general direction of movement of the metal is downward, whereas the general direction of movement of the gas is upward. The oppositely directed flows render the action of the gas more effective; it is also found that, per unit of surface of the porous, gas-permeable elements in contact with the molten metal, it is possible to pass through without disadvantage a specific delivery of gas of 0.7 N.T.P. 1/min./cm.$^2$ instead of 0.30 N.T.P. 1/min./cm.$^2$ which is generally regarded, in the case of static operation, as a maximum above which the effectiveness of the blowing-in operation decreases rapidly and metal splashes become considerable.

The bottom of the downstream compartment is occupied for the greater part by two porous, gas-permeable elements in the form of plugs 50, 52; a pipe 54, with flow-meter and expansion valve, supplies these plugs with gas individually.

Blowing gas into the downstream compartment has the main effect of sweeping inclusions and making them rise to the surface of the metal. The slag or flux 32, which is also not always necessary, then traps these inclusions in an irreversible manner.

The gas blown into the downstream compartment may have a different composition from that of the gas blown into the upstream compartment. Both these gases must be inert and harmless, e.g., nitrogen, argon or helium.

A cover 56, lined with refractory material and thermally insulated, is placed on the upstream compartment; it could also cover the downstream compartment. The function of the cover is to prevent the access of air, to reduce losses of heat by radiation and to prevent the oxidation of the metal. A chimney 58 permits evacuating the gases coming from the upstream compartment. A mobile hopper 60 permits dropping into the upstream compartment solid additions (magnesium, silicon, copper, for example) or liquid additions. A tube 62 permits introducing gas, for example, in order to create an inert atmosphere before the filling with molten metal.

At the end of the treatment process, the tank is emptied by tipping.

To degasify aluminum, a ladle of the type illustrated has been used, containing 750 kg. of metal and with its greatest width 64–66 measuring 830 mm. The upstream compartment was equipped with 5 porous plugs each having an upper surface 68 of 345 cm.$^2$; nitrogen was blown-in at a rate of 62 N.T.P. m.$^3$/h., which corresponds to a specific delivery of 0.60 liter per minute and per square centimeter. Good results have also been obtained with the same porous plugs when the amount blown-in varies from 52 to 155 m.$^3$/h., or 0.50 to 1.5 1/min./cm.$^2$.

The downstream compartment was equipped with two porous, gas-permeable plugs identical to the foregoing, through which nitrogen was blown-in at a total delivery of 4.2 N.T.P. m.$^3$/h.; the specific delivery was therefore only 0.1 liter per minute and per square centimeter, the upward movement of the bubbles in the compartment being in the direction of flow of the metal.

With the same plugs, the rate of flow could vary from 2.1 to 12.6 N.T.P. m.$^3$/h., or 0.05 to 0.3 1/min./cm.$^2$.

None of the compartments, nor the passage between them, is obstructed by an inner impediment. The removal of undissolved impurities is effected by the floating action of the bubbles in compartment 12 and not by a filter.

In this relatively small tank, it is possible to treat thus, per hour, 45 metric tons of aluminum initially containing rather little gas or 30 metric tons of aluminum initially containing a great deal of gas.

The ladle illustrated can be modified without departing from the spirit and scope of our invention. For example, it is possible to modify the arrangement or the number of the porous elements; the general form of the ladle in plan view may be varied, for instance it may have approximately the form of an ellipse, of a rectangle, or of an oval; and one or both compartments may be replaced by a plurality of compartments through which the molten metal flows in parallel.

Having described our invention, we claim:

1. A non-polluting continuous process for the removal of non-dissolved impurities from molten metal selected from the group consisting of aluminum and aluminum alloy and for degassing said metal, comprising:

establishing an unobstructed generally downward flow of said metal through a first compartment, and an unobstructed generally lateral flow of said metal through a passage connecting the said first compartment with a second compartment, establishing an unobstructed generally upward flow of said metal through said second compartment, insufflating into the lower end of said first compartment fine bubbles of a gas inert to said molten metal and in admixture with almost all of the volume of molten metal in said first compartment, sweeping said non-dissolved impurities up to the surface of the metal in said second compartment by insufflating into the lower end of said second compartment fine bubbles of a gas inert to said metal in admixture with almost all of the volume of molten metal in said second compartment, removing the molten metal from beneath said swept-up impurities, and maintaining the upper surface of the metal in both of said compartments substantially at atmospheric pressure.

2. A process as claimed in claim 1, in which the cross-sectional area of said downward flow is substantially greater than the cross-sectional area of said upward flow.

3. A process as claimed in claim 1, and introducing said fine bubbles through gas-permeable wall means that are disposed in the bottom portions of both compartments and that have areas greater than half the cross-sectional area of the respective compartments.

4. A process as claimed in claim 3, in which the gas emitted into said downward flow leaves said permeable wall means at a flow rate of 0.5 to 1.5 N.T.P. liters per minute per square centimeter.

5. A process as claimed in claim 3, in which the gas emitted into said upward flow leaves said permeable wall means at a flow rate of 0.05 to 0.3 N.T.P. liter per minute per square centimeter.

6. A process as claimed in claim 3, in which the gas emitted into said downward flow leaves said permeable wall means at a flow rate of 0.5 to 1.5 N.T.P. liters per minute per square centimeter and the gas emitted into said upward flow leaves said permeable wall means at a flow rate of 0.05 to 0.3 N.T.P. liter per minute per square centimeter.

7. A process as claimed in claim 1, said gas being a member selected from the group consisting of nitrogen, argon and helium.

8. A process as claimed in claim 1, and maintaining a layer of non-metallic material on the surface of the molten metal above said upward flow.

9. A process as claimed in claim 1, and restricting the outlet for the gas escaping at least at the upper end of said upward flow by confining said gas to a stream the cross section of which is very substantially smaller than the cross section of said upward flow.

10. Apparatus for the non-polluting continuous removal of non-dissolved impurities from molten metal selected from the group consisting of aluminum and aluminum alloy and for degassing said metal, comprising an upstream compartment free of inner impediment, a downstream compartment free of any inner impediment and having a smaller cross-sectional area in a horizontal plane than the upstream compartment, said upstream compartment having an outlet and said downstream compartment having an inlet that are disposed in the lower portions of the respective compartments and that are interconnected by a bottom passage free of any inner impediment, an inlet into the upper portion of said upstream compartment for metal to be purified, at least one porous, gas-permeable element disposed in the bottom portion of said upstream compartment, means for flowing gas inert to said metal through said at least one element and into the molten metal in said upstream compartment, said at least one element in said upstream compartment having an area of contact with molten metal in said upstream compartment which is greater than half the cross-sectional area of the upstream compartment, and means for sweeping said non-dissolved impurities up to the surface of the metal in said downstream compartment, said sweeping means comprising at least one porous, gas-permeable element disposed in the bottom portion of said downstream compartment, means for flowing gas inert to said metal through the last-named at least one element and into the molten metal in said downstream compartment, said at least one element in said downstream compartment having an area of contact with molten metal in the downstream compartment which is greater than half the cross-sectional area of the downstream compartment, and means for removing from the upper portion of said downstream compartment and from beneath said swept-up impurities the molten metal which has passed upwardly through said downstream compartment.

11. Apparatus as claimed in claim 10, there being a plurality of said elements disposed in the bottom portion of said upstream compartment and disposed sufficiently close to one another and to the walls of said upstream compartment to ensure that substantially all the metal in said upstream compartment is mixed with bubbles of gas blown into the compartment through the porous elements.

12. Apparatus as claimed in claim 10, there being a plurality of said elements disposed in the bottom portion of said downstream compartment and disposed sufficiently close to one another and to the walls of said downstream compartment to ensure that substantially all the metal in said downstream compartment is mixed with bubbles of gas blown into the compartment through the porous elements.

13. Apparatus as claimed in claim 10, and a cover covering the upstream compartment and allowing exit space for the exit of gases, the cross-sectional area of said exit space being substantially smaller than the cross-sectional area of the upstream compartment.

14. Apparatus as claimed in claim 13, and an inlet for introducing a gas between the cover and the surface of the metal inside the upstream compartment.

15. Apparatus as claimed in claim 13, said cover having an inlet for introducing material into the upstream compartment.

16. Apparatus as claimed in claim 10, the total area of said at least one porous, gas-permeable element disposed in the bottom portion of said upstream compartment being substantially greater than the total area of said at least one porous, gas-permeable element disposed in the bottom portion of said downstream compartment.

17. A process as claimed in claim 1, in which the total flow of inert gas into said molten metal in said first compartment is substantially greater than the total flow of said inert gas into said molten metal in said second compartment.

References Cited
UNITED STATES PATENTS

| | | | |
|---|---|---|---|
| 3,039,864 | 6/1962 | Hess | 75—93 |
| 3,490,897 | 1/1970 | Dore | 75—93 |
| 2,024,751 | 12/1935 | Stroup | 75—93 |
| 3,356,489 | 12/1967 | Feichtinger | 75—93 |
| 3,321,300 | 5/1967 | Worner | 75—49 |
| 2,839,292 | 6/1958 | Bellamy | 75—93 |

L. DEWAYNE RUTLEDGE, Primary Examiner
P. D. ROSENBERG, Assistant Examiner

U.S. Cl. X.R.
75—67, 93; 266—34